US012404894B2

(12) United States Patent
Smith et al.

(10) Patent No.: US 12,404,894 B2
(45) Date of Patent: Sep. 2, 2025

(54) ADJUSTABLE HINGE FASTENERS FOR USE WITH A BIDET APPARATUS

(71) Applicants: Jeremy Smith, San Diego, CA (US); Anjum Gupta Gupta, San Diego, CA (US); Yash Jawanjal, San Diego, CA (US)

(72) Inventors: Jeremy Smith, San Diego, CA (US); Anjum Gupta Gupta, San Diego, CA (US); Yash Jawanjal, San Diego, CA (US)

( * ) Notice: Subject to any disclaimer, the term of this patent is extended or adjusted under 35 U.S.C. 154(b) by 96 days.

(21) Appl. No.: 18/114,422

(22) Filed: Feb. 27, 2023

(65) Prior Publication Data

US 2024/0288029 A1   Aug. 29, 2024

(51) Int. Cl.
*F16C 11/04* (2006.01)
*E03D 9/08* (2006.01)

(52) U.S. Cl.
CPC ............... *F16C 11/04* (2013.01); *E03D 9/08* (2013.01)

(58) Field of Classification Search
CPC .................................. E03D 9/08; F16C 11/04
USPC ............. 4/420.4, 420.3, 420, 443, 447, 448
See application file for complete search history.

(56) References Cited

U.S. PATENT DOCUMENTS

| | | | | |
|---|---|---|---|---|
| 4,136,407 A * | 1/1979 | Maurer | ..................... | E03D 9/08 |
| | | | | 4/448 |
| 5,666,672 A * | 9/1997 | Birsel | ....................... | E03D 9/08 |
| | | | | 4/236 |
| 6,321,396 B1 * | 11/2001 | Vallejo | ...................... | E03D 9/08 |
| | | | | 4/447 |
| 9,637,903 B2 * | 5/2017 | Gupta | ....................... | E03D 9/08 |
| 11,814,834 B2 * | 11/2023 | Gupta | ...................... | B05B 15/16 |
| 11,879,244 B2 * | 1/2024 | Ethier | ..................... | E03D 9/085 |
| 2006/0070173 A1 * | 4/2006 | Yoon | ......................... | E03D 9/08 |
| | | | | 4/420.4 |
| 2006/0162058 A1 * | 7/2006 | Moss | ........................ | E03D 9/08 |
| | | | | 4/420.4 |
| 2014/0101838 A1 * | 4/2014 | Gupta | .................... | B05B 15/16 |
| | | | | 4/448 |
| 2015/0305577 A1 * | 10/2015 | Gupta | ................... | A47K 13/26 |
| | | | | 4/448 |
| 2017/0114530 A1 * | 4/2017 | Lee | .......................... | E03D 9/08 |
| 2017/0342695 A1 * | 11/2017 | Gupta | ....................... | E03D 9/08 |
| 2020/0318335 A1 * | 10/2020 | Gupta | ....................... | E03C 1/12 |
| 2021/0262214 A1 * | 8/2021 | Gupta | ....................... | E03D 9/08 |

(Continued)

FOREIGN PATENT DOCUMENTS

WO    WO-9849402 A2 *  11/1998  ............. E03D 9/085

*Primary Examiner* — Lori L Baker

(57) ABSTRACT

An adjustable bidet washing apparatus includes two or more adjustable disk hinge fasteners configured for adjustably securing the apparatus, wherein the adjustable disk hinge fasteners each include a disk having two or more openings along its perimeter, and a securing slot for securing the apparatus to a toilet bowl, and a bracket holder having two bracket holder arms, wherein each bracket holder arm includes a pin or a dowel configured to engage one of the two or more openings along the perimeter of the disk; or a bracket holder having two bracket holder arms, wherein each bracket holder arm includes an opening; and a disk having at least two pins or dowels along its perimeter, each configured to engage one of the one or more openings on the two bracket holder arms, and a securing slot for securing the apparatus.

27 Claims, 15 Drawing Sheets

(56) References Cited

U.S. PATENT DOCUMENTS

| | | | | |
|---|---|---|---|---|
| 2022/0098845 A1* | 3/2022 | Gupta | ...................... | E03D 5/105 |
| 2022/0162843 A1* | 5/2022 | Gupta | ........................ | E03D 9/08 |
| 2022/0341146 A1* | 10/2022 | Gupta | ................... | B05B 7/2467 |
| 2024/0151018 A1* | 5/2024 | Fang | ....................... | E03D 9/005 |
| 2024/0287776 A1* | 8/2024 | Gupta | ........................ | E03D 9/08 |
| 2024/0288029 A1* | 8/2024 | Smith | ..................... | F16C 11/04 |

* cited by examiner

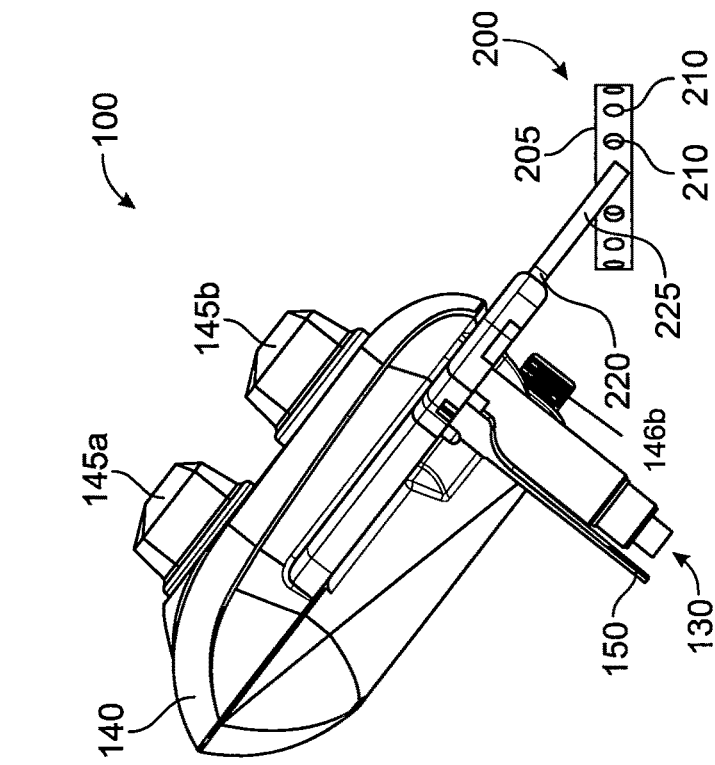
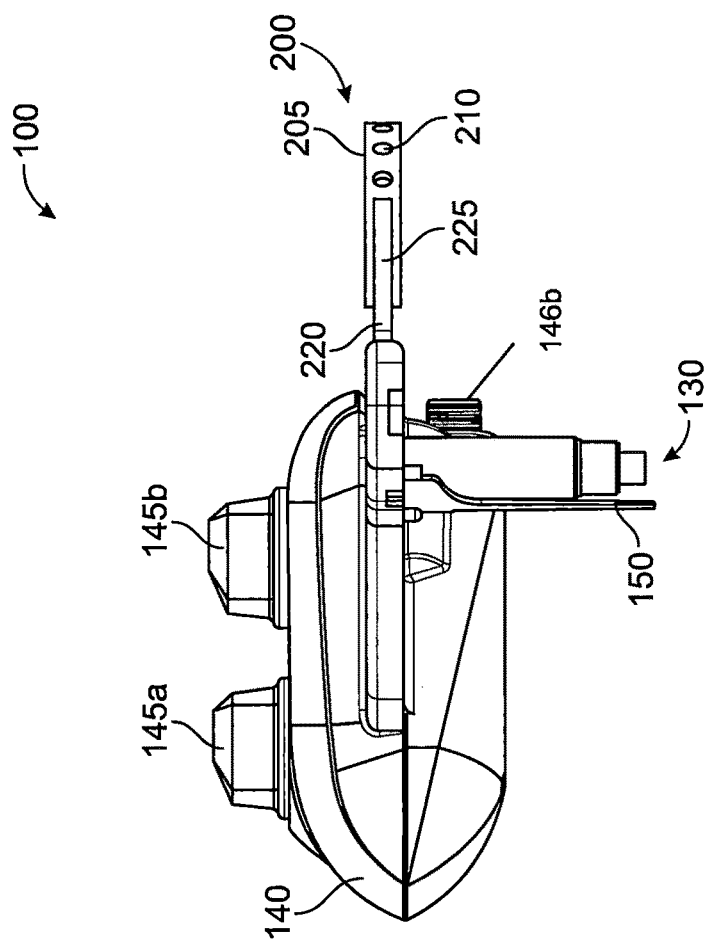
FIG. 10A
FIG. 10B

ADJUSTABLE HINGE FASTENERS FOR USE WITH A BIDET APPARATUS

TECHNICAL FIELD OF THE INVENTION

The disclosure generally relates to a bidet washing apparatus and more particularly to adjustable hinge fasteners for use with a bidet apparatus.

BACKGROUND OF THE INVENTION

Bidet apparatuses for washing and cleaning body parts (e.g., genital and/or anal regions) with water were originally developed in the form of a bidet that provided a single spray of water from a permanently attached fixture built into a toilet bowl. However, such bidets were expensive and a new generation of attachable bidets with a plurality of nozzles for multiple water sprays were developed. These bidets may be attached to the sitting area of a toilet bowl for washing the body parts of a person, as well as the bidet itself, using water sprayed from the bidet nozzles.

Various attachable bidet designs have provided some of the desired washing and cleaning effects; however, existing bidets fail to address all concerns related to the design and function of bidets. For example, some attachable bidet apparatuses may not be suitable for use with all toilet bowls due to the structural differences or variations present in the connecting portions of the apparatus and the securing holes present on a toilet bowl. In addition, contamination or pollution of the bidet apparatus during use, including the under surfaces of the bidet and the outer surfaces of the nozzles, is a common problem that causes aesthetic and hygienic issues. Cleaning these surfaces may be problematic due to the inconvenience and difficulty in effectively reaching all of the contaminated areas, especially with the way most bidet apparatuses are more or less permanently attached to the toilet bowl. These problems are particularly important in bidets used, for example, by infirm or sick people who have to be especially cautious about maintaining hygiene and preventing infections.

Thus, there remains a need for an improved attachable bidet apparatus that allows a user to easily attach and/or clean the apparatus and toilet for aesthetic and hygienic reasons.

SUMMARY OF THE INVENTION

The following detailed description is of the best currently contemplated mode of carrying out exemplary embodiments herein. The description is not to be taken in a limiting sense but is made merely for the purpose of illustrating the general principles of the exemplary embodiments herein, since the scope of the disclosure is best defined by the appended claims. Various inventive features are described below that may each be used independently of one another or in combination with other features.

Broadly, embodiments of the disclosure herein generally provide a bidet washing apparatus adjustably attachable to a toilet bowl for cleaning one or more body parts of a user, which includes two or more adjustable disk hinge fasteners configured for adjustably securing the bidet washing apparatus to the toilet bowl, wherein the two or more adjustable disk hinge fasteners each include a disk having two or more openings along its perimeter, and a securing slot for securing the bidet washing apparatus to a toilet bowl; and a bracket holder having two bracket holder arms, wherein each bracket holder arm includes a pin or a dowel configured to engage one of the two or more openings along the perimeter of the disk; or a bracket holder having two bracket holder arms, wherein each bracket holder arm includes an opening; and a disk having at least two pins or dowels along its perimeter, each configured to engage one of the one or more openings on the two bracket holder arms, and a securing slot for securing the bidet washing apparatus to a toilet bowl; one or more water inlets configured to supply water to the bidet washing apparatus; a control unit, housing one or more valves connected to the one or more water inlets, including one or more control switches configured to operate the one or more valves, wherein the one or more valves control water flow from the one or more water inlets; and a nozzle assembly including at least one washing nozzle, connected to at least one of the one or more valves with one or more water tubes, wherein the at least one washing nozzle is positionable for directing water to the one or more body parts of the user.

In one aspect, the disclosure provides a bidet washing apparatus, wherein the disks are polygon-shaped disks.

In another aspect, the disclosure provides a bidet washing apparatus, wherein the disks are each independently a geometric shaped disk selected from a circle, triangle, rectangle, rhombus, square, and a trapezoid.

In another aspect, the disclosure provides a bidet washing apparatus, wherein the securing slot on the disks is a U-shaped securing slot.

In another aspect, the disclosure provides a bidet washing apparatus, wherein the pin or dowel on each of the two bracket holder arms is inserted into one of the two or more openings along the perimeter of the disk at about 180 degrees to each other.

In another aspect, the disclosure provides a bidet washing apparatus, wherein the at least two pins or dowels along the perimeter of the disk are inserted into the opening on the bracket holder arms at about 180 degrees to each other.

In another aspect, the disclosure provides a bidet washing apparatus, wherein each bracket holder can rotate vertically about the pins or dowels of the bracket holder arms or the pins or dowels of the disks.

In another aspect, the disclosure provides a bidet washing apparatus, wherein the securing slots on the disks are substantially parallel to each other.

In another aspect, the disclosure provides a bidet washing apparatus, wherein the securing slots on the disks can each independently rotate about a vertical axis from about −45 degrees to about +45 degrees.

In another embodiment, the disclosure provides a bidet washing apparatus adjustably attachable to a toilet bowl for cleaning one or more body parts of a user, which includes two or more adjustable disk hinge fasteners configured for adjustably securing the bidet washing apparatus to the toilet bowl, wherein the two or more adjustable disk hinge fasteners each includes a disk having a securing slot for securing the bidet washing apparatus to a toilet bowl; a half ring having two or more openings along its perimeter, and an internal ridge, lip or slot for securing the disk; and a bracket holder having two bracket holder arms, wherein each bracket holder arm includes a pin or a dowel configured to engage one of the two or more openings along the perimeter of the half ring; or a disk having a securing slot for securing the bidet washing apparatus to a toilet bowl; a bracket holder having two bracket holder arms, wherein each bracket holder arm includes an opening; and a half ring having at least two pins or dowels along its perimeter, each configured to engage one of the one or more openings on the bracket holder arms, and an internal ridge, lip or slot for securing the disk; one or more water inlets configured to supply water to the bidet washing apparatus; a control unit, housing one or more valves connected to the one or more water inlets, including one or more control switches configured to operate the one or more valves, wherein the one or more valves control water flow from the one or more water inlets; and a nozzle assembly including at least one washing nozzle, connected to at least one of the one or more valves with one or more water tubes, wherein the at least one washing nozzle is positionable for directing water to the one or more body parts of the user.

In one aspect, the disclosure provides a bidet washing apparatus, wherein the disks are polygon-shaped disks.

In another aspect, the disclosure provides a bidet washing apparatus, wherein the disks are each independently a geometric shaped disk selected from a circle, triangle, rectangle, rhombus, square, and a trapezoid.

In another aspect, the disclosure provides a bidet washing apparatus, wherein the securing slot on the disks is a U-shaped securing slot.

In another aspect, the disclosure provides a bidet washing apparatus, wherein the pin or dowel on each of the two bracket holder arms is inserted into one of the two or more openings along the perimeter of the half ring at about 180 degrees to each other.

In another aspect, the disclosure provides a bidet washing apparatus, wherein the at least two pins or dowels along the perimeter of the half ring are inserted into the opening on the bracket holder arms at about 180 degrees to each other.

In another aspect, the disclosure provides a bidet washing apparatus, wherein each bracket holder can rotate vertically about the pins or dowels of the bracket holder arms or the pins or dowels of the half ring.

In another aspect, the disclosure provides a bidet washing apparatus, wherein the securing slots on the disks are substantially parallel to each other.

In another aspect, the disclosure provides a bidet washing apparatus, wherein the securing slots on the disks can each independently rotate about a vertical axis from about −45 degrees to about +45 degrees.

In another embodiment, the disclosure provides a bidet washing apparatus adjustably attachable to a toilet bowl for cleaning one or more body parts of a user, which includes two or more adjustable disk hinge fasteners configured for adjustably securing the bidet washing apparatus to the toilet bowl, wherein the two or more adjustable disk hinge fasteners each includes a disk having two or more openings along its perimeter, and a securing slot for securing the bidet washing apparatus to a toilet bowl; a half ring having at least two pins or dowels along its inner perimeter, each configured to engage one of the two or more openings along the perimeter of the disk; and a bracket holder having two bracket holder arms, wherein each bracket holder arm includes an internal ridge, lip or slot for securing the half ring; or a half ring having two or more openings along its inner perimeter; a disk having at least two pins or dowels along its perimeter, each configured to engage one of the two or more openings on the inner perimeter of the half ring, and a securing slot for securing the bidet washing apparatus to a toilet bowl; and a bracket holder having two bracket holder arms, wherein each bracket holder arm includes an internal ridge, lip or slot for securing the half ring; one or more water inlets configured to supply water to the bidet washing apparatus; a control unit, housing one or more valves connected to the one or more water inlets, including one or more control switches configured to operate the one or more valves, wherein the one or more valves control water flow from the one or more water inlets; and a nozzle assembly including at least one washing nozzle, connected to at least one of the one or more valves with one or more water tubes, wherein the at least one washing nozzle is positionable for directing water to the one or more body parts of the user.

In one aspect, the disclosure provides a bidet washing apparatus, wherein the disks are polygon-shaped disks.

In another aspect, the disclosure provides a bidet washing apparatus, wherein the disks are each independently a geometric shaped disk selected from a circle, triangle, rectangle, rhombus, square, and a trapezoid.

In another aspect, the disclosure provides a bidet washing apparatus, wherein the securing slot on the disks is a U-shaped securing slot.

In another aspect, the disclosure provides a bidet washing apparatus, wherein the pins or dowels along the inner perimeter of the half ring is inserted into one of the two or more openings on the disk at about 180 degrees to each other.

In another aspect, the disclosure provides a bidet washing apparatus, wherein the at least two pins or dowels along the perimeter of the disk are inserted into the two or more openings along the inner perimeter of the half ring at about 180 degrees to each other.

In another aspect, the disclosure provides a bidet washing apparatus, wherein each bracket holder can rotate vertically about the pins or dowels of the half ring or the pins or dowels of the disks.

In another aspect, the disclosure provides a bidet washing apparatus, wherein the securing slots on the disks are substantially parallel to each other.

In another aspect, the disclosure provides a bidet washing apparatus, wherein the securing slots on the disks can each independently rotate about a vertical axis from about −45 degrees to about +45 degrees.

In another embodiment, the disclosure provides methods for attaching a bidet washing apparatus to a toilet bowl, which includes attaching a first end of the one or more adjustable disk hinge fasteners to securing holes in the toilet bowl; and attaching a second end of the one or more adjustable disk hinge fasteners to the bidet washing apparatus.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 10A and 10B are right side views of a bidet washing apparatus showing the apparatus in a seated position and in a rotated upwards position, respectively;

DETAILED DESCRIPTION OF THE INVENTION

Figure 1:
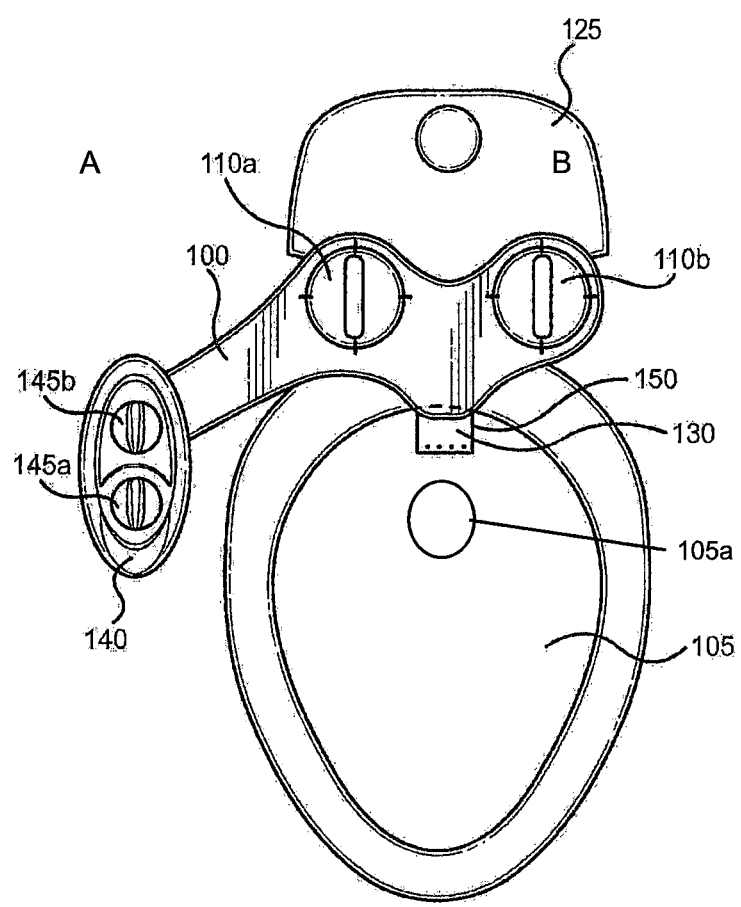
FIG. 1 is a top perspective view of a bidet washing apparatus installed on a toilet bowl without a toilet seat.

The following description is presented to enable a person of ordinary skill in the art to make and use the embodiments described herein. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the disclosure. Thus, the present disclosure is not intended to be limited to the examples described herein and shown but is to be accorded the scope consistent with the claims.

As used herein, the word "exemplary" means "serving as an example illustration." Any aspect or design described herein as "exemplary" is not necessarily to be construed as preferred or advantageous over other aspects or designs. It should be understood that the specific order or hierarchy of steps in the process disclosed herein is an example of exemplary approaches. Based upon design preferences, it is understood that the specific order or hierarchy of steps in the processes may be rearranged while remaining within the scope of the present disclosure. Any accompanying method claims present elements of the various steps in a sample order, and are not meant to be limited to the specific order or hierarchy presented.

As described herein, a "bidet washing apparatus," or a "bidet" is a toilet attachment for cleaning the body parts of the user.

As described herein, the term "water inlet" means any structure that may provide water to the bidet washing apparatus.

As described herein, the term "control unit" (aka "control panel") refers to the housing that has "control switch(es)" thereon, for controlling the various functionalities of the bidet, including but not limited to controlling the flow of water through the nozzles; controlling and/or adjusting the angle of the nozzles; and controlling the opening and/or closing of the protective shield gate.

As described herein, the term "control valves" refers to the controller parts located inside the control panel housing, which controls the flow of water or other fluids from the water inlet(s) to one or more "water tubes," by opening, closing or partially obstructing various passageways.

As described herein, the term "water tubes" refers to channels that connect the control valves to a "nozzle assembly."

As described herein, the term "nozzle assembly" refers to a single nozzle or a collection of nozzles including at least one "washing nozzle." As described herein, the term "nozzle assembly" may also have other types of nozzles such as a "self-cleaning nozzle," which is used to clean the nozzle assembly itself, a "toilet cleaning nozzle," which is used to clean the bidet and/or the toilet, and a "shield cleaning nozzle," which is used for cleaning the "protective shield gate."

As described herein, the term "nozzle" refers to a device designed to eject water or other fluids as a coherent controlled spray.

As described herein, the term "washing nozzle" refers to the nozzle that may be used to wash the body parts of a user.

As described herein, the term "protective shield gate" refers to a structure placed at least partially in front of the nozzle assembly (e.g., between the user and the nozzle assembly) to protect the nozzle assembly from pollutants. In some embodiments, the protective shield gate may have a "hinged" edge.

As described herein, the term "adjustable disk hinge fastener" is a generic term for any "rotationally adjustable disk hinge fastener," that is used to fasten or secure a bidet washing apparatus to a toilet bowl, and which allows the apparatus to be independently moved in a horizontal direction and to pivot in a vertical direction.

As described herein, the term "hinged" refers to a joint that allows the turning or pivoting of the protective shield gate, by any conventional turning or pivoting mechanism.

As described herein, the term "fluidically coupled" or "fluidically connected" refers to a connection or a passageway that allows fluid to flow therethrough.

The various embodiments disclosed herein provide a new, clean and hygienic bidet washing apparatus with one or more adjustable hinge fasteners, which may be attachable to an existing toilet for cleaning the body parts of the user sitting on or near the toilet.

Figure 2:
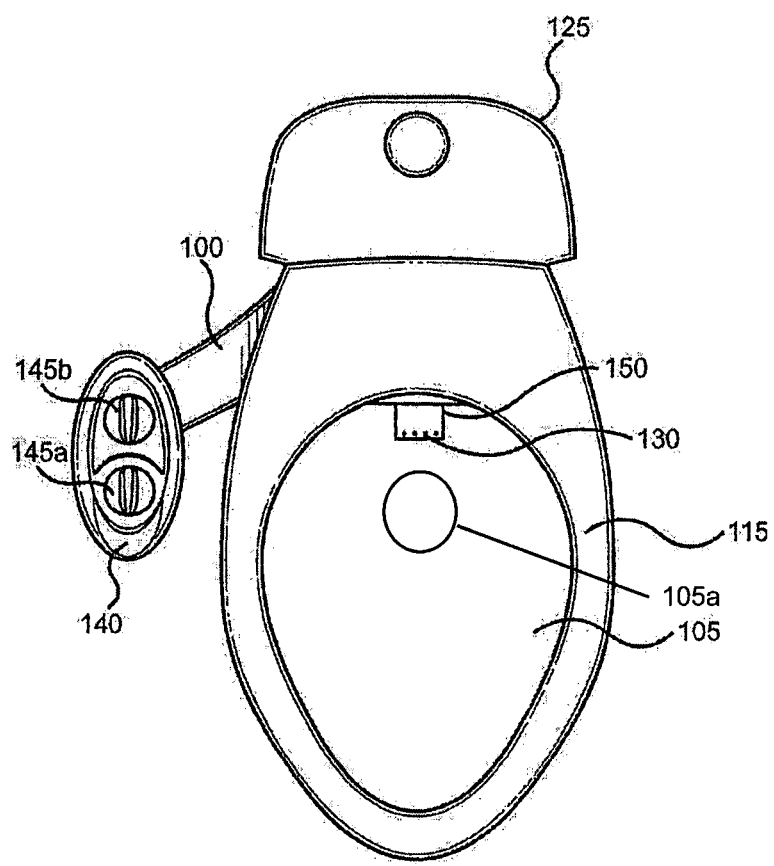
FIG. 2 is a top perspective view of a bidet washing apparatus installed on a toilet bowl with the toilet seat down.

FIGS. 1 and 2 illustrate a top view of a bidet washing apparatus 100 mounted on top of a toilet bowl 105 with outlet 105a, using securing mechanisms 110a and 110b. FIG. 1 illustrates a bidet washing apparatus 100 on top of the toilet bowl 105 without a toilet seat; whereas FIG. 2 illustrates a bidet washing apparatus 100 on top of the toilet bowl 105 with a toilet seat 115 in the down position.

As shown in FIG. 2, the toilet seat 115 can pivot upwards while being connected to a rear portion of the toilet bowl 105 as is known in the art, wherein the toilet seat 115 partially covers the bidet washing apparatus 100 and the toilet bowl 105 when the seat is in the down position as shown. A refillable toilet tank 125 can be mounted on a rear portion of the toilet bowl 105, in which an amount of water may be stored.

In some embodiments, the bidet washing apparatus 100 may include a nozzle assembly 130, which can include at least one washing nozzle (not shown) for washing one or more body parts, e.g. anus and genitals, of a user sitting on or near the toilet bowl 105. In an embodiment, the bidet washing apparatus 100 may include a nozzle assembly 130 having two or more washing nozzles. However, in other embodiments a lesser or greater number of washing nozzles may be used. In some embodiments, each washing nozzle may independently spray a stream of water upwardly and inwardly towards the user. In other embodiments, the bidet washing apparatus 100 may include a nozzle assembly 130, which has a protective shield gate 150 substantially or partially in front of it. The position of the protective shield gate 150 allows it to act as a shield between the user's body and/or water in the toilet bowl 105 and the nozzle assembly 130 and nozzles, thus protecting the nozzle assembly and nozzles from contamination or pollution during use.

As shown in FIGS. 1 and 2, the bidet washing apparatus 100 may include a control unit 140 for easy access to the user. The control unit 100 houses control switches 145*a* and 145*b*, which provides operating instructions to the bidet washing apparatus. The depicted example in FIGS. 1 and 2 show two control switches: 145*a* and 145*b*; however, one of ordinary skill in the art would realize that any number of switches may be provided for performing various operations, without departing from the scope of the present disclosure. Some examples of operating instructions include but are not limited to controlling the flow of water from a water inlet; controlling the angle of the washing nozzles; and controlling the opening and closing of a protective shield gate for protecting the washing nozzles. The type of control switches include but are not limited to knobs, dials, levers, and depressible buttons, or any conventional control mechanism known to those of skill in the art. In an embodiment, the bidet washing apparatus may have all similar control switches, wherein both control switches are knobs, dials, or levers. In other embodiments, the bidet washing apparatus may have a control switch that is a knob, and a control switch that is a dial or lever and/or vice-versa.

In various embodiments, a bidet washing apparatus may be adjustably attachable to a toilet bowl through one or more adjustable disk hinge fasteners present on the bidet washing apparatus to securing holes present on a toilet bowl. In these embodiments, the adjustable hinge disk fastener includes a disk having a plurality of openings along its outer perimeter, and a securing slot for securing a bidet washing apparatus to a toilet bowl. Further, the adjustable hinge fastener includes a bracket holder having two bracket holder arms, each arm having a pin or dowel for engaging one of the plurality of openings along the perimeter of the disk.

Figure 3:
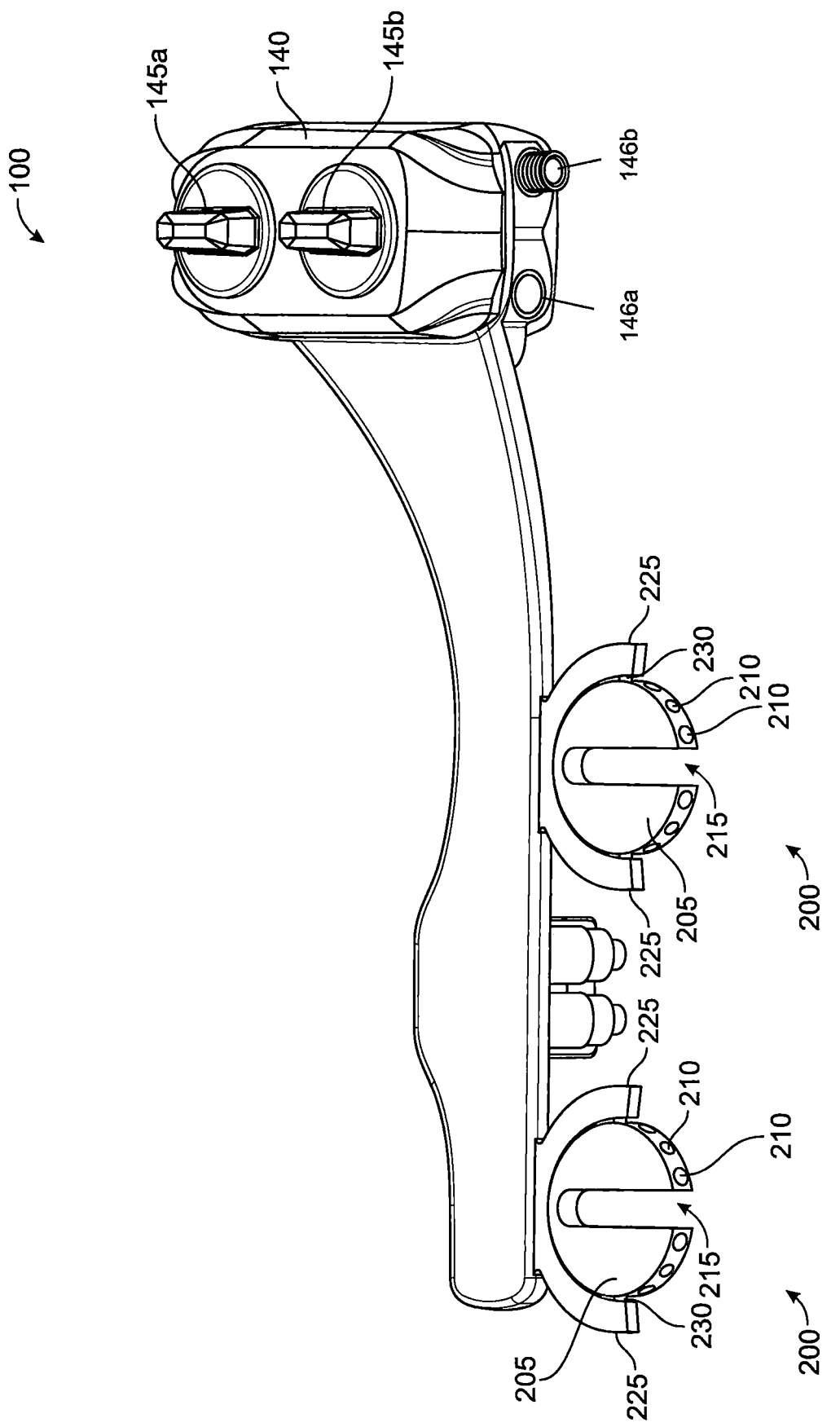
FIG. 3 is a top rear perspective view of a bidet washing apparatus having a pair of adjustable disk hinge fasteners for attaching the bidet to a toilet bowl.

FIG. 3 illustrates a top rear view of an embodiment of a bidet washing apparatus 100 having a pair of adjustable disk hinge fasteners 200 for attaching the bidet to a toilet bowl. Also shown in this figure is the control unit 140; control switches 145*a* and 145*b*; and water inlets 146*a* and 146*b*.

As shown in FIG. 3, each adjustable disk hinge fastener 200 includes a disk 205 having a plurality of openings 210 along the perimeter of the disk, and a securing slot 215 that can be used to connect the bidet washing apparatus 100 to a toilet bowl (not shown) using a bolt, washer and nut configuration as is known in the art (also not shown).

In embodiments, the disks can each independently be of any convenient size or shape including but not limited to a flat, circular shaped disk, a polygon-shaped disk, or a geometric shaped disk selected from a circle, a triangle, a rectangle, a rhombus, a square, and a trapezoid.

As shown in FIG. 3, the disk 205 can be attached to the bidet washing apparatus 100 using bracket holders 220, each having a pair of bracket holder arms 225. The bracket holders 220 can be permanently or reversibly attached to the bidet washing apparatus 100 using any means known in the art, including but not limited to being built in as part of the apparatus, glued on, bolted or screwed on, and the like. In embodiments, the pair of bracket holder arms 225 can include a pin or dowel (not shown) that can engage with or be inserted into one of the plurality of openings 210 along the perimeter of the disk 205.

In other embodiments, the adjustable disk hinge fastener can include a bracket holder having two bracket holder arms, wherein each bracket holder arm includes a plurality of openings along its inner perimeter, and a disk having a pair of pins or dowels each configured to engage one of the openings along the inner perimeter of the bracket holder arms (not shown).

Figure 4:
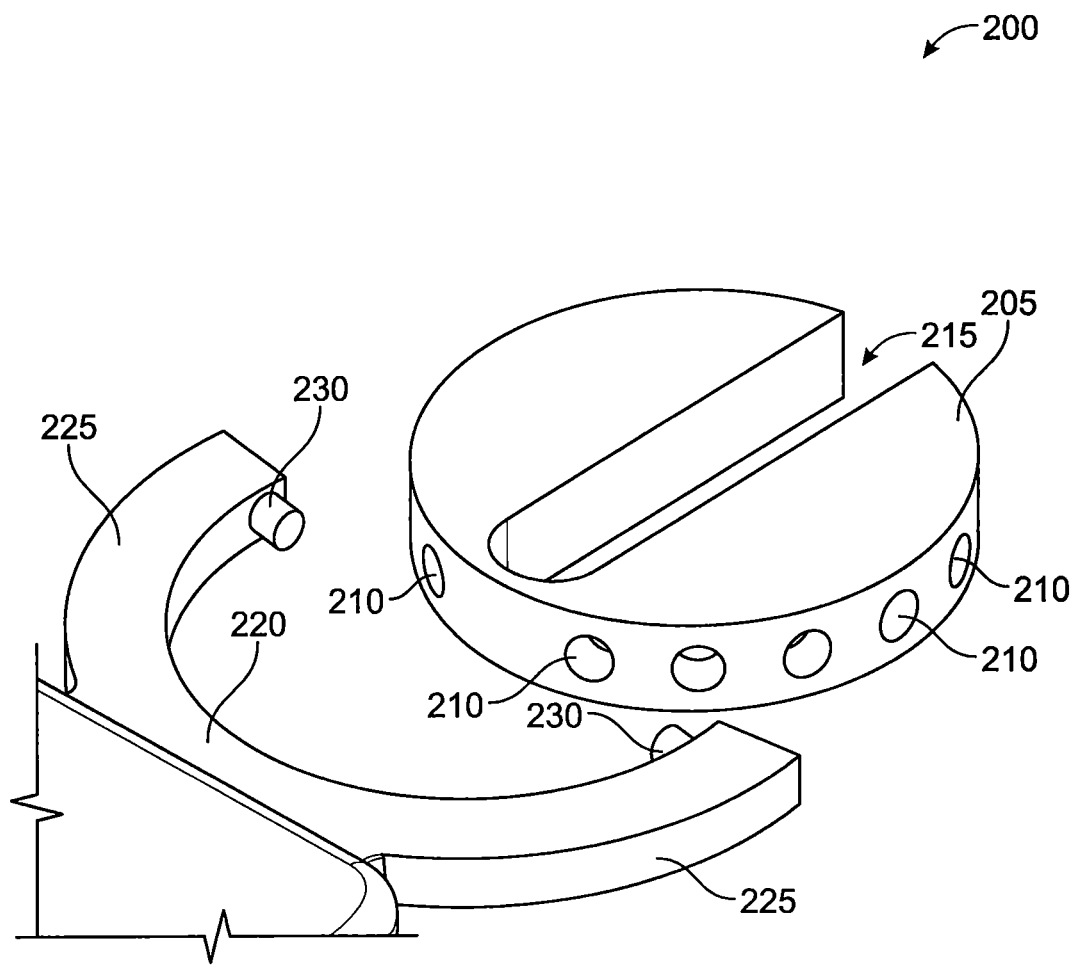
FIG. 4 is an exploded top, front perspective view of an adjustable disk hinge fastener.

FIG. 4 illustrates an embodiment of an exploded top, front view of the adjustable disk hinge fastener 200, showing the disk 205 with the openings 210 along the perimeter of the disk and securing slot 215, bracket holder 220 with bracket holder arms 225 and the pin or dowel 230, which can engage with or be inserted into the openings 210 on each side of the disk. This arrangement allows for easy removal of the bidet washing apparatus by allowing it to be snapped off from the brackets for better cleaning. In addition, the pivot point for rotation of the adjustable hinge fasteners, i.e., the pin or dowel bracket arm and disk configuration, allows the bracket holder and bidet washing apparatus to be vertically lifted off from a toilet bowl for a more thorough cleaning.

Figure 5:
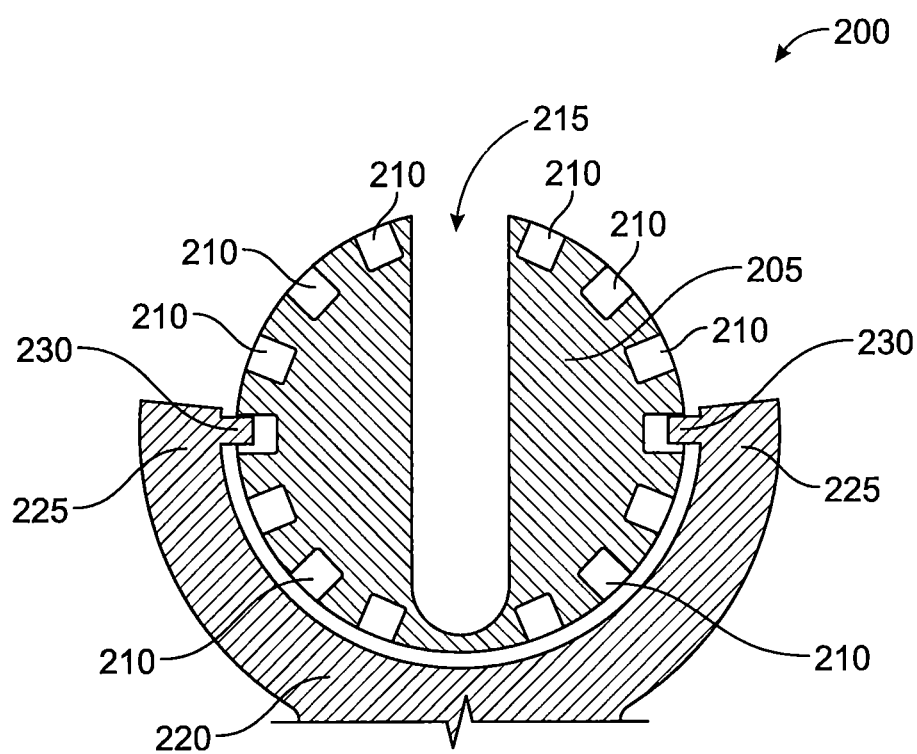
FIG. 5 is a cut-away of a top perspective view of the adjustable disk hinge fastener.
Figure 6:
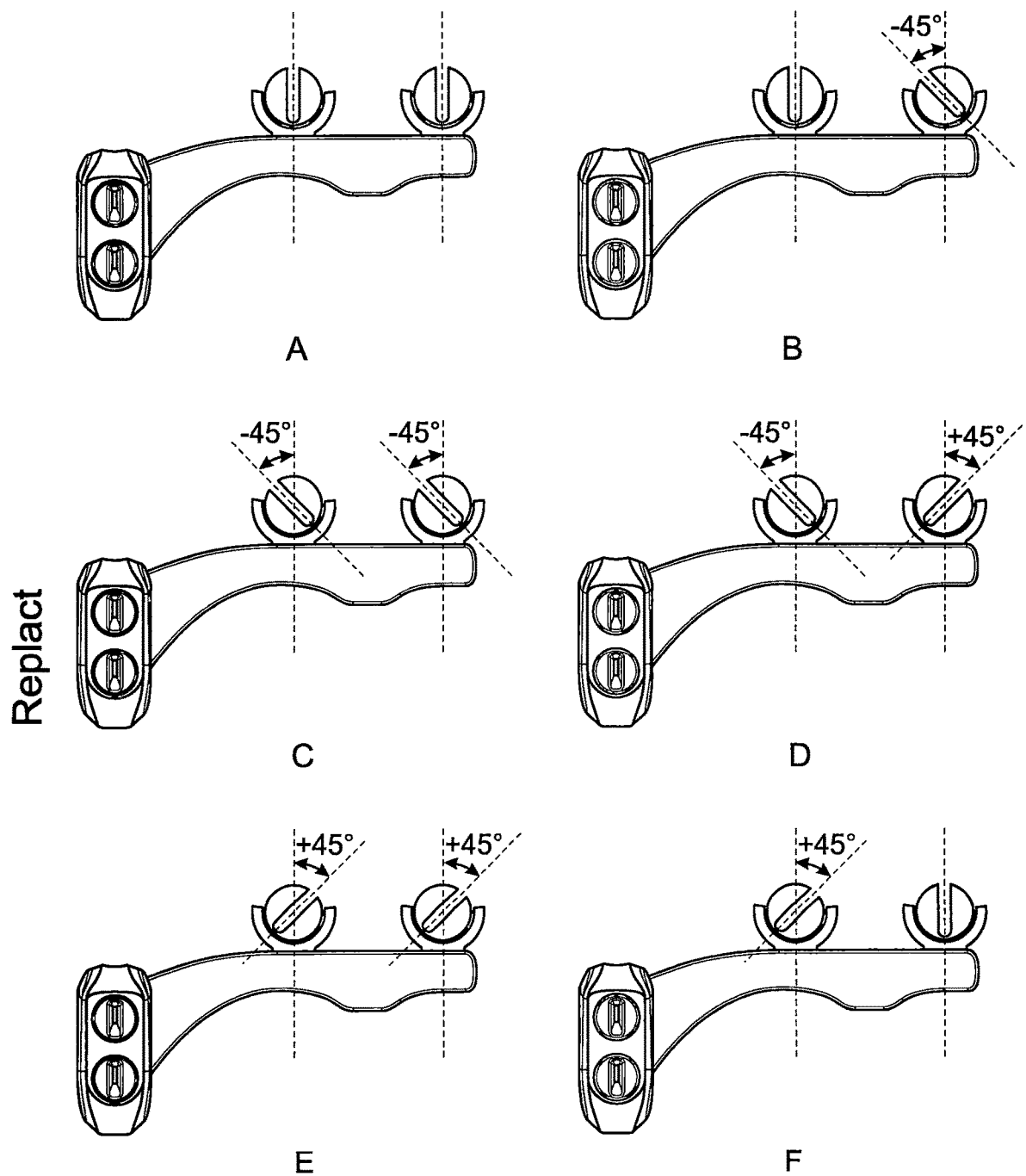
FIGS. 6A, 6B, 6C, 6D, 6E and 6F are top, rear perspective views of a bidet washing apparatus with the adjustable hinge fasteners at different degrees of rotation.

FIG. 5 illustrates an embodiment of a cut-away of a top view of the adjustable disk hinge fastener 200, having a disk 205 with openings 210 and securing slot 215, bracket holder 220 and bracket holder arms 225. As shown, the pin or dowel 230 on the bracket holder arms 225 each engage with or insert into insert into one of the openings 210 on each side of the disk 205, which allows the fastener (and an attached bidet washing apparatus) to pivot or rotate around the bracket holder arms and bracket holder in a vertical direction, thus facilitating cleaning of the apparatus when it is attached to a toilet bowl.

FIGS. 6A, 6B, 6C, 6D, 6E and 6F illustrate embodiments of a top, rear view of a bidet washing apparatus 100 having the disks 205 with different degrees of rotation with respect to the securing slot 215. As shown, each of the disks can be independently rotated in a horizontal direction by allowing the pin or dowel 230 to be engaged with or inserted into a desired opening 210 in the disk, thus facilitating attachment of the bidet washing apparatus to a toilet bowl. In some embodiments, the securing slots on the disks are substantially parallel to each other. In other embodiments, the securing slots on the disks can each independently rotate about a vertical axis from about −45 degrees to about +45 degrees including all degrees there between.

The adjustable disk hinge fasteners can also enable a user to change the angle of the nozzle assembly (not shown) by raising or lowering the bidet washing apparatus during use. That is, the hinged operation is not only useful for being able to clean the toilet bowl or for easy installation, but it can also be used as an apparatus that makes the whole bidet (and the nozzle angle) adjustable.

Figure 7:
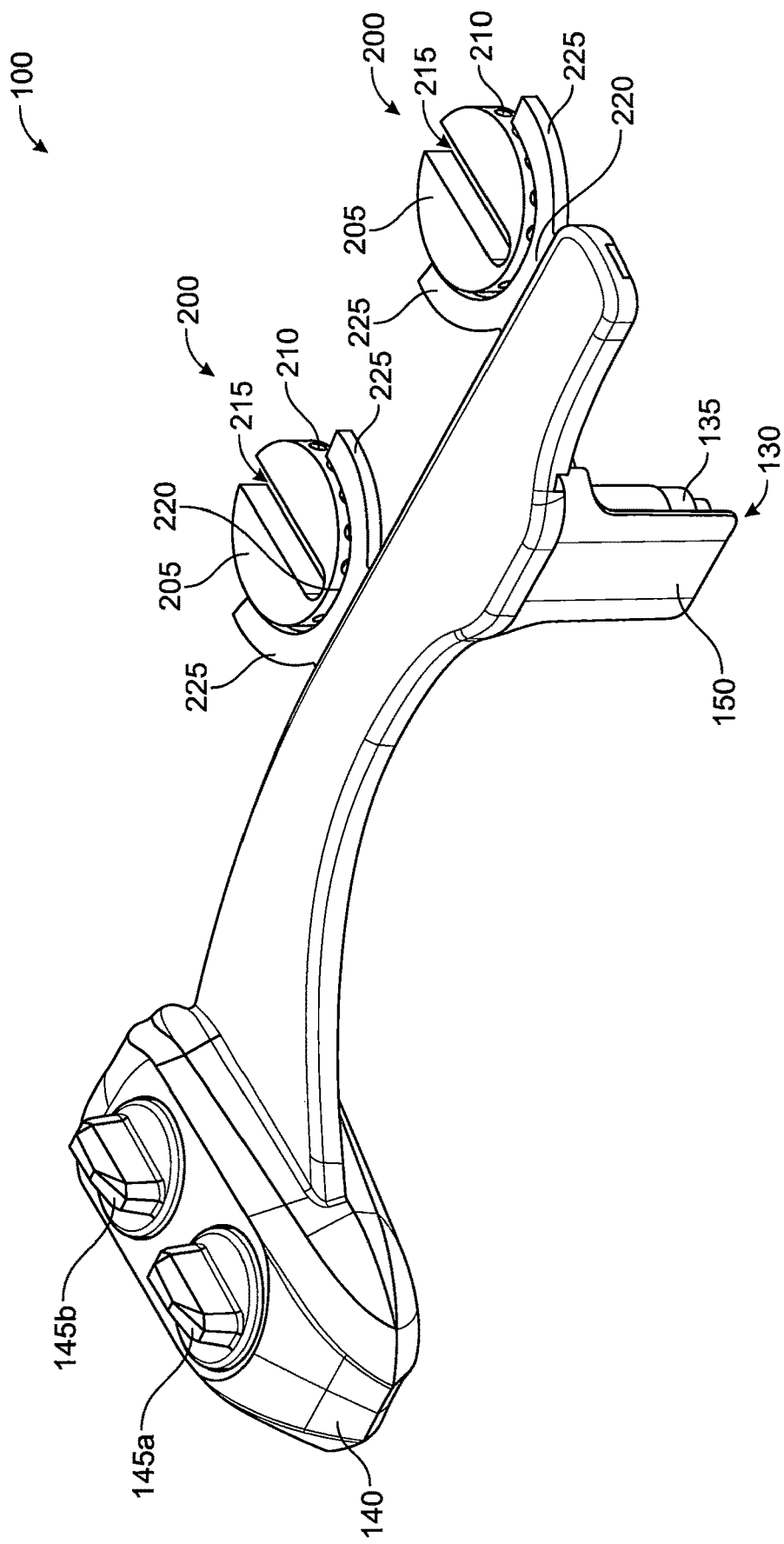
FIG. 7 is a top, front perspective view of a bidet washing apparatus with adjustable disk hinge fasteners.

FIG. 7 illustrates an embodiment of a top, front view of the bidet washing apparatus 100, which includes the adjustable disk hinge fastener 200, disk 205 with openings 210 and securing slot 215, bracket holder 220 and bracket holder arms 225, and the pins or dowels (not shown), which engage with or insert into one of the plurality of openings 210 along the perimeter of the disk 205. Also shown is the nozzle assembly 130; washing nozzles 135; the protective shield gate 150; the control unit 140; and control unit switches 145*a* and 145*b*.

Figure 8:
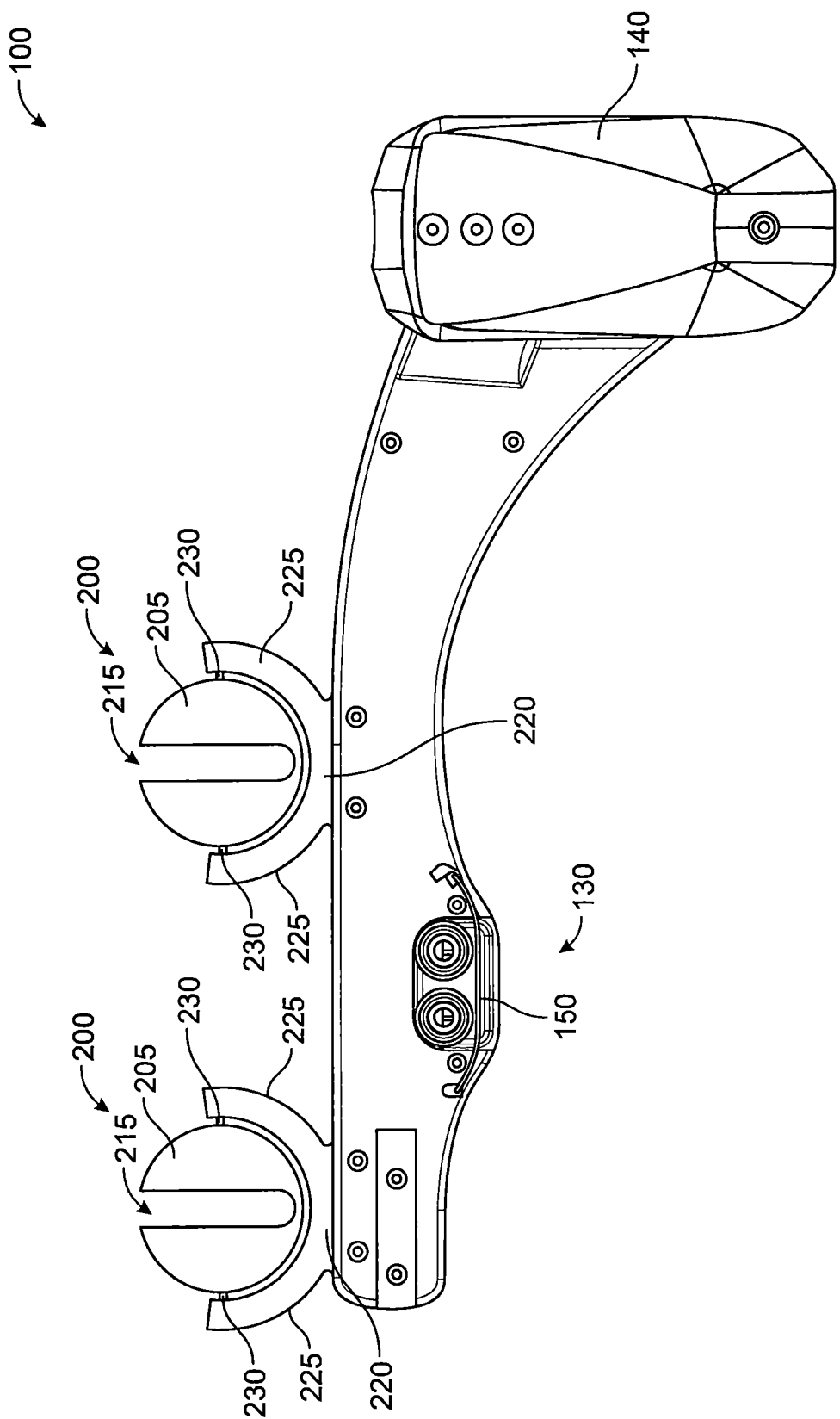
FIG. 8 is a bottom perspective view of a bidet washing apparatus with adjustable disk hinge fasteners.

FIG. 8 illustrates an embodiment of a bottom view of the bidet washing apparatus 100, which includes the adjustable disk hinge fastener 200, disk 205 with openings 210 and securing slot 215, bracket holder 220 and bracket holder arms 225, and the pins or dowels (not shown), which engage with or insert into one of the plurality of openings 210 along the perimeter of the disk 205. Also shown is the nozzle assembly 130; washing nozzles 135; the protective shield gate 150; and the control unit 140.

Figure 9:
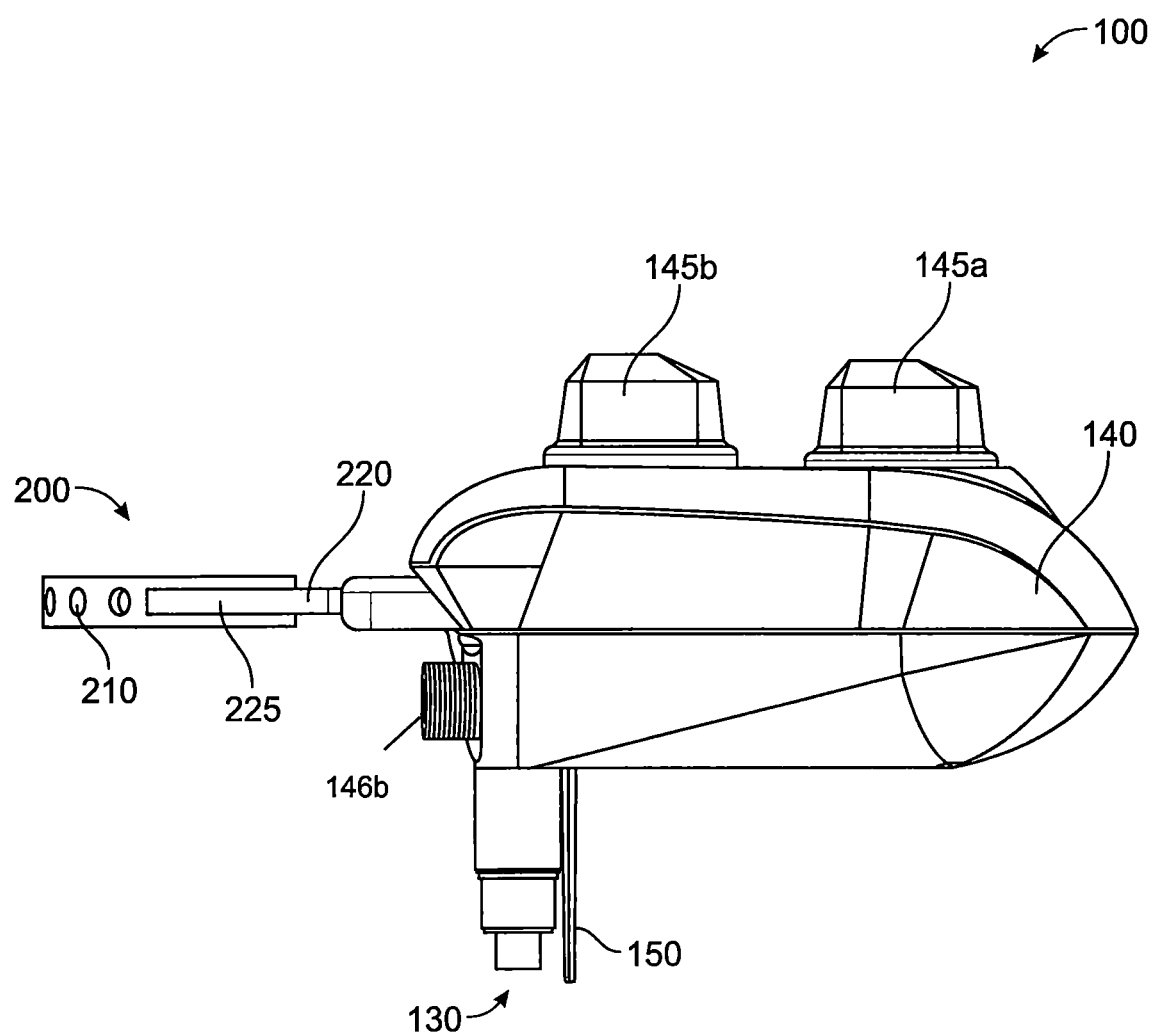
FIG. 9 is a left side perspective view of a bidet washing apparatus with adjustable disk hinge fasteners.

FIG. 9 illustrates an embodiment of a left side view of the bidet washing apparatus 100, which includes the adjustable disk hinge fastener 200, disk 205 with openings 210 and securing slot 215, bracket holder 220 and bracket holder arms 225, and the pins or dowels (not shown), which engage with or insert into one of the plurality of openings 210 along the perimeter of the disk 205. Also shown is the nozzle assembly 130; washing nozzles 135; the protective shield gate 150; the control unit 140; and control unit switches 145a and 145b.

FIGS. 10A and 10B illustrates an embodiment of a right side view of the bidet washing apparatus 100, showing the apparatus in a seated position (FIG. 10A) and in a rotated upwards position (FIG. 10B), respectively. As shown, the bidet washing apparatus 100 includes the adjustable disk hinge fasteners 200, disks 205 with openings 210 and securing slots 215, bracket holders 220 and bracket holder arms 225, and the pins or dowels (not shown), which engage with or insert into one of the plurality of openings 210 along the perimeter of the disk 205. Also shown is the nozzle assembly 130; washing nozzles 135; the protective shield gate 150; the control unit 140; and control unit switches 145a and 145b. As shown in this figure, the bidet washing apparatus can pivot or rotate vertically upwards about the bracket arms while the disks stays in a seated position.

Figure 11:
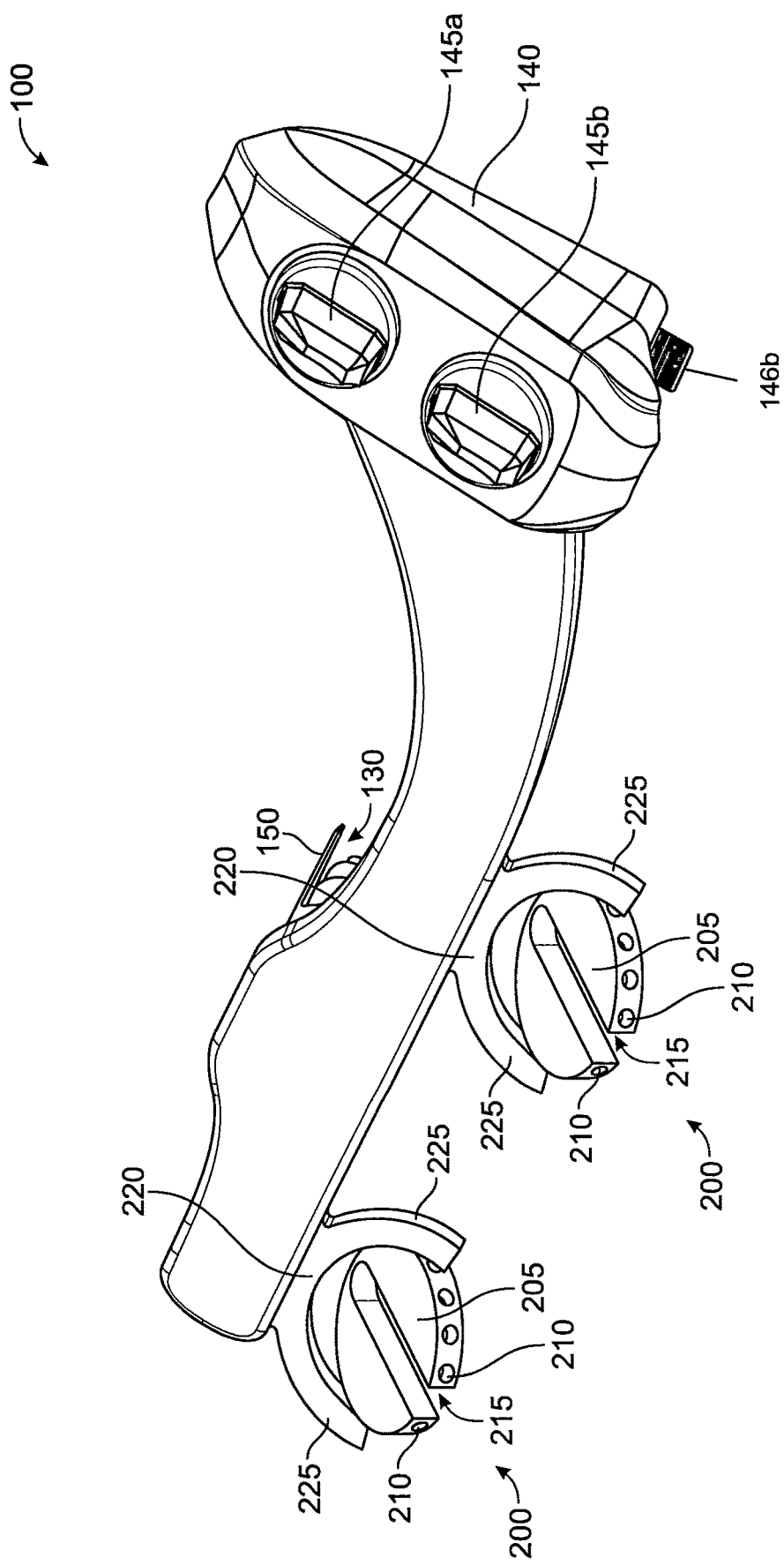
FIG. 11 is a rear top perspective view of a bidet washing apparatus showing the apparatus in a rotated upwards position.

FIG. 11 illustrates an embodiment of a rear top view of the bidet washing apparatus 100, showing the apparatus in a rotated upwards position. As shown, the apparatus includes the adjustable disk hinge fasteners 200, disks 205 with openings 210 and securing slots 215, bracket holders 220 and bracket holder arms 225, and the pins or dowels (not shown), which engage with or insert into one of the plurality of openings 210 along the perimeter of the disk 205. Also shown is the nozzle assembly 130; washing nozzles 135; the protective shield gate 150; the control unit 140; and control unit switches 145a and 145b. As shown in this figure, the bidet washing apparatus can pivot or rotate upwards about the disk hinge fasteners while the disks stay in a seated position.

In various other embodiments, a bidet washing apparatus can be adjustably attachable to a toilet bowl through one or more adjustable disk hinge fasteners present on the bidet washing apparatus to securing holes present on a toilet bowl. In these embodiments, the adjustable hinge disk fastener includes a disk having a securing slot for securing the bidet washing apparatus to a toilet bowl; a half ring having a plurality of openings along its outer perimeter and an internal ridge, lip or slot for securing the disk; and a bracket holder having two bracket holder arms, wherein each bracket holder arm includes a pin or a dowel configured to engage one of the openings along the outer perimeter of the half ring.

Figure 12:
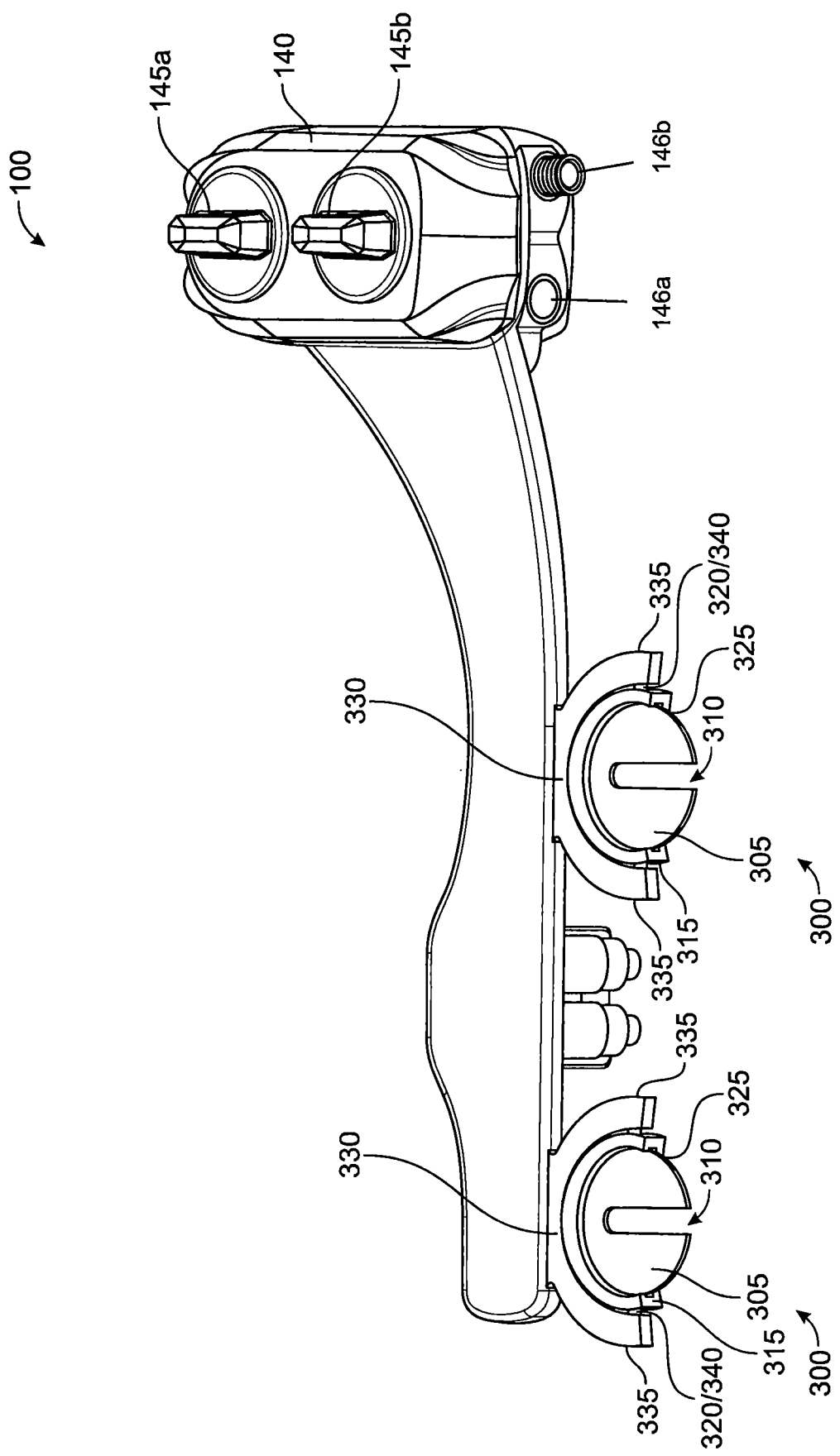
FIG. 12 is a top rear perspective view of a bidet washing apparatus having a pair of adjustable disk hinge fasteners for attaching the bidet to a toilet bowl.

FIG. 12 illustrates a top rear view of an embodiment of a bidet washing apparatus 100 having a pair of adjustable disk hinge fasteners 300 for attaching the bidet to a toilet bowl. Also shown in this figure is the control unit 140; and control switches 145a and 145b.

As shown in FIG. 12, each adjustable disk hinge fastener 300 includes a disk 305 and a securing slot 310 that can be used to connect the bidet washing apparatus to a toilet bowl using a bolt, washer and nut configuration. The disk 305 can be engaged with or inserted into a rotatable half ring 315 having a plurality of openings 320 surrounding the perimeter of the half ring. The disk 305 can be attached to the half ring via an internal ridge, lip or slot 325. The disk 305 and half ring 315 can be attached to the bidet washing apparatus via bracket holders 330 having a pair of bracket holder arms 335.

The bracket holders can be permanently or reversibly attached to the bidet washing apparatus using any means known in the art, including but not limited to being built in as part of the apparatus, glued on, screwed on and the like.

In embodiments, the pair of bracket holder arms 335 can include a pin or dowel 340 that can engage with or be inserted into one of the plurality of openings 320 along the perimeter of the half ring 315.

In other embodiments, the adjustable disk hinge fastener can include a disk having a securing slot for securing the bidet washing apparatus to a toilet bowl; a bracket holder having two bracket holder arms, wherein each bracket holder arm includes a plurality of opening along an inner perimeter of the half ring and an internal ridge, lip or slot for securing the disk; and a half ring having a pair of pins or dowels each configured to engage one of the openings along the inner perimeter of the half ring (not shown).

In still other embodiments, the adjustable disk hinge fastener can include a disk having an internal ridge, lip or slot for securing the half ring, and a securing slot for securing the bidet washing apparatus to a toilet bowl; a half ring having a plurality of openings along its outer perimeter; and a bracket holder having two bracket holder arms, wherein each bracket holder arm includes a pin or a dowel configured to engage one of the openings along the outer perimeter of the half ring (not shown).

Figure 13:
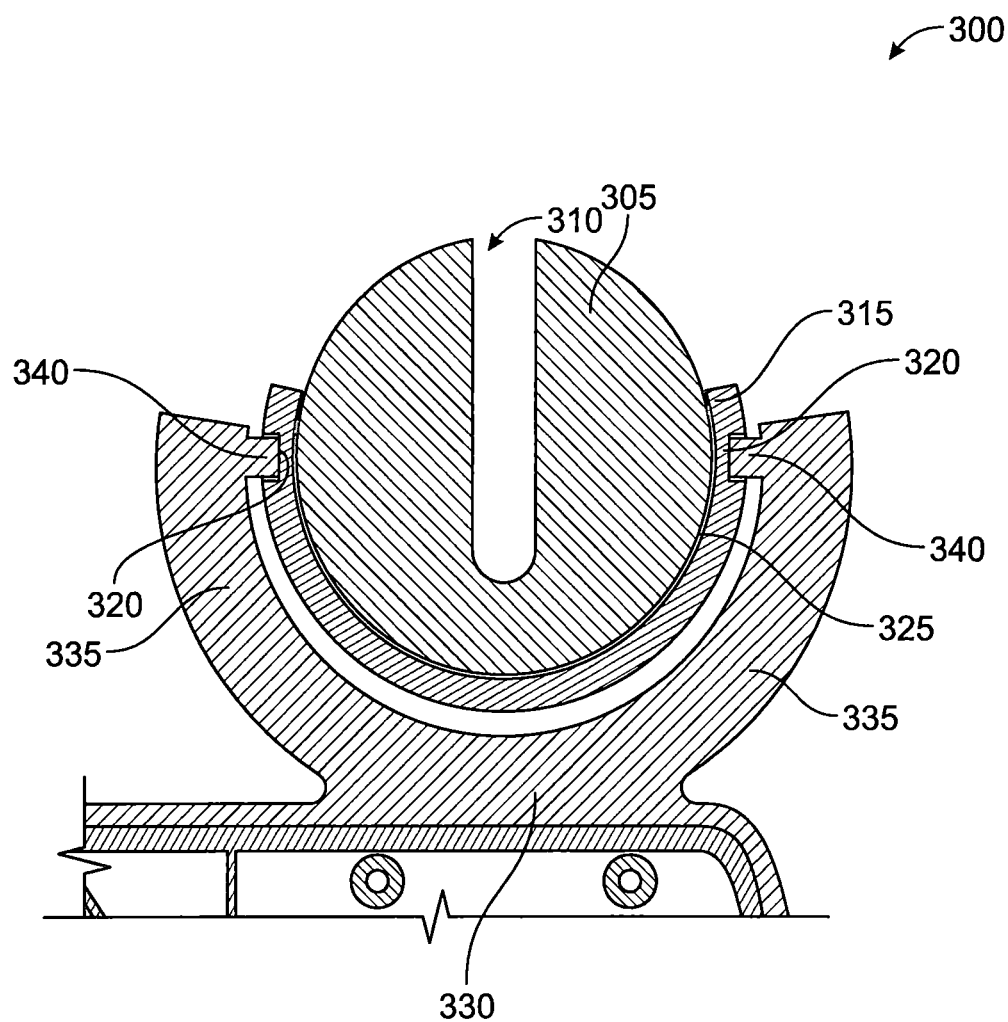
FIG. 13 is a cut-away top perspective view of the adjustable disk hinge fastener.

FIG. 13 illustrates an embodiment of a cut-away top view of the adjustable disk hinge fastener 300, having a rotatable disk 305 and securing slot 310, rotatable half ring 315 with openings 320, bracket holder 330 with bracket holder arms 335. As shown, the pin or dowel 340 on the bracket holder arms 335 can engage with or insert into one of the openings 320 on each side of the half ring 315, which allows the fastener (and an attached bidet washing apparatus) to pivot or rotate around the bracket holder arms in a vertical direction, thus facilitating cleaning of the apparatus when it is attached to a toilet bowl.

Figure 14:
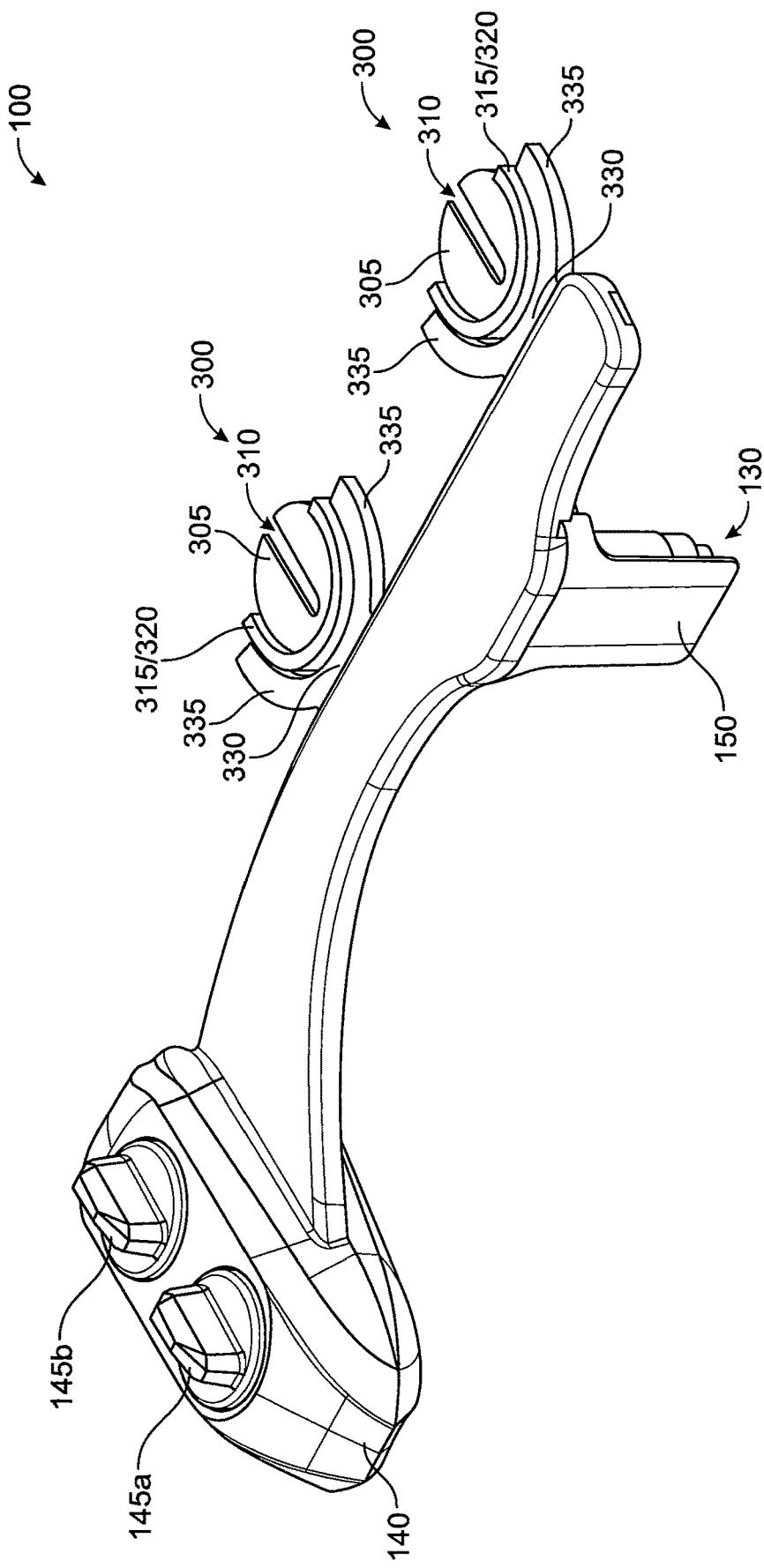
FIG. 14 is a top, front perspective view of a bidet washing apparatus having adjustable disk hinge fasteners.
Figure 15:
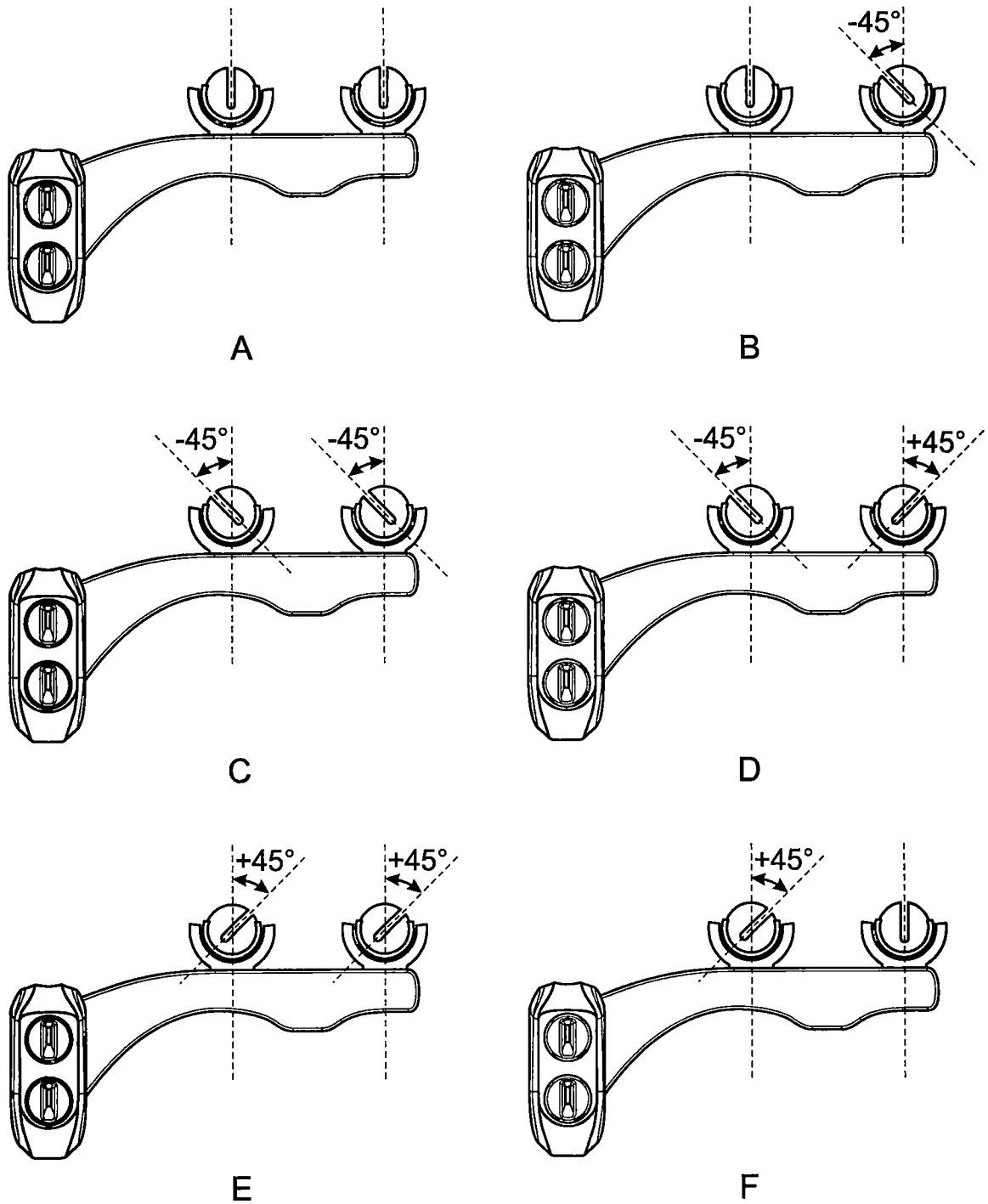
FIGS. 15A, 15B, 15C, 15D, 15E, and 15F are top, rear perspective views of a bidet washing apparatus having adjustable hinge fasteners.

FIG. 14 illustrates an embodiment of a top, front view of the bidet washing apparatus 100, having adjustable disk hinge fasteners 300, which includes the rotatable disk 305 and securing slot 310, rotatable half ring 315 with openings 320, bracket holder 330 with bracket holder arms 335 and the pin or dowel (not shown), which engages with or inserts into the openings of the half ring. Also shown is the nozzle assembly 130; washing nozzles 135; the protective shield gate 150; the control unit 140; and control unit switches 145a and 145b.

FIGS. 15A, 15B, 15C, 15D, 15E and 15F illustrate embodiments of a top, rear view of a bidet washing apparatus 100 and adjustable hinge fasteners 300, which includes the rotatable disks 305 with different degrees of rotation with respect to the securing slot 310. Also shown is the rotatable half ring 315 with openings 320, bracket holder 330 with bracket holder arms 335 and the pin or dowel (not shown), which engages with or inserts into the openings of the half ring. Also shown is the nozzle assembly 130; washing nozzles 135; the protective shield gate 150; the control unit 140; and control unit switches 145a and 145b.

As shown in these figures, each of the disks can be independently rotated in a horizontal direction by rotating the disk to a desired position, thus facilitating attachment of the bidet washing apparatus to a toilet bowl. In some embodiments, the securing slots on the disks are substantially parallel to each other. In other embodiments, the securing slots on the disks can each independently rotate about a vertical axis from about −45 degrees to about +45 degrees including all degrees there between.

While the inventive features have been particularly shown and described with reference to embodiments thereof, it will be understood by those in the art that the foregoing and other changes may be made therein without departing from the sprit and the scope of the disclosure. Likewise, the various diagrams may depict an example architectural or other configuration for the disclosure, which is done to aid in understanding the features and functionality that may be included in the disclosure. The disclosure is not restricted to the illustrated example architectures or configurations, but may be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead may be applied alone or in some combination, to one or more of the other embodiments of the disclosure, whether or not such embodiments are described, and whether or not such features are presented as being a part of a described embodiment. Thus, the breadth and scope of the present disclosure should not be limited by any of the above-described exemplary embodiments.

What is claimed is:

1. A bidet washing apparatus adjustably attachable to a toilet bowl for cleaning one or more body parts of a user, comprising:
   two or more adjustable disk hinge fasteners configured for adjustably securing the bidet washing apparatus to the toilet bowl, wherein the two or more adjustable disk hinge fasteners each include:
      a disk having two or more openings along its perimeter, and a securing slot for securing the bidet washing apparatus to a toilet bowl; and
      a bracket holder having two bracket holder arms, wherein each bracket holder arm includes a pin or a dowel configured to engage one of the two or more openings along the perimeter of the disk;
      or
      a bracket holder having two bracket holder arms, wherein each bracket holder arm includes an opening; and
      a disk having at least two pins or dowels along its perimeter, each configured to engage one of the one or more openings on the two bracket holder arms, and a securing slot for securing the bidet washing apparatus to a toilet bowl;
   one or more water inlets configured to supply water to the bidet washing apparatus;
   a control unit, including one or more control switches configured to control water flow from the one or more water inlets; and
   a nozzle assembly including at least one washing nozzle, wherein the at least one washing nozzle is positionable for directing the water flow to the one or more body parts of the user.

2. The bidet washing apparatus of claim 1, wherein the disks are polygon-shaped disks.

3. The bidet washing apparatus of claim 1, wherein the disks are each independently a geometric shaped disk selected from a circle, triangle, rectangle, rhombus, square, and a trapezoid.

4. The bidet washing apparatus of claim 1, wherein the securing slot on the disks is a U-shaped securing slot.

5. The bidet washing apparatus of claim 1, wherein the pin or dowel on each of the two bracket holder arms is inserted into one of the two or more openings along the perimeter of the disk at about 180 degrees to each other.

6. The bidet washing apparatus of claim 1, wherein the at least two pins or dowels along the perimeter of the disk are inserted into the opening on the bracket holder arms at about 180 degrees to each other.

7. The bidet washing apparatus of claim 1, wherein each bracket holder can rotate vertically about the pins or dowels of the bracket holder arms or the pins or dowels of the disks.

8. The bidet washing apparatus of claim 1, wherein the securing slots on the disks are substantially parallel to each other.

9. The bidet washing apparatus of claim 1, wherein the securing slots on the disks can each independently rotate about a vertical axis from about −45 degrees to about +45 degrees.

10. A bidet washing apparatus adjustably attachable to a toilet bowl for cleaning one or more body parts of a user, comprising:
    two or more adjustable disk hinge fasteners configured for adjustably securing the bidet washing apparatus to the toilet bowl, wherein the two or more adjustable disk hinge fasteners each include:
       a disk having a securing slot for securing the bidet washing apparatus to a toilet bowl;
       a half ring having two or more openings along its perimeter, and an internal ridge, lip or slot for securing the disk; and
       a bracket holder having two bracket holder arms, wherein each bracket holder arm includes a pin or a dowel configured to engage one of the two or more openings along the perimeter of the half ring;
       or
       a disk having a securing slot for securing the bidet washing apparatus to a toilet bowl;
       a bracket holder having two bracket holder arms, wherein each bracket holder arm includes an opening; and
       a half ring having at least two pins or dowels along its perimeter, each configured to engage one of the one or more openings on the bracket holder arms, and an internal ridge, lip or slot for securing the disk;
    one or more water inlets configured to supply water to the bidet washing apparatus;
    a control unit, including one or more control switches configured to control water flow from the one or more water inlets; and
    a nozzle assembly including at least one washing nozzle, wherein the at least one washing nozzle is positionable for directing the water flow to the one or more body parts of the user.

11. The bidet washing apparatus of claim 10, wherein the disks are polygon-shaped disks.

12. The bidet washing apparatus of claim 10, wherein the disks are each independently a geometric shaped disk selected from a circle, triangle, rectangle, rhombus, square, and a trapezoid.

13. The bidet washing apparatus of claim 10, wherein the securing slot on the disks is a U-shaped securing slot.

14. The bidet washing apparatus of claim 10, wherein the pin or dowel on each of the two bracket holder arms is inserted into one of the two or more openings along the perimeter of the half ring at about 180 degrees to each other.

15. The bidet washing apparatus of claim 10, wherein the at least two pins or dowels along the perimeter of the half ring are inserted into the opening on the bracket holder arms at about 180 degrees to each other.

16. The bidet washing apparatus of claim 10, wherein each bracket holder can rotate vertically about the pins or dowels of the bracket holder arms or the pins or dowels of the half ring.

17. The bidet washing apparatus of claim 10, wherein the securing slots on the disks are substantially parallel to each other.

18. The bidet washing apparatus of claim 10, wherein the securing slots on the disks can each independently rotate about a vertical axis from about −45 degrees to about +45 degrees.

19. A bidet washing apparatus adjustably attachable to a toilet bowl for cleaning one or more body parts of a user, comprising:
- two or more adjustable disk hinge fasteners configured for adjustably securing the bidet washing apparatus to the toilet bowl, wherein the two or more adjustable disk hinge fasteners each include:
  - a disk having two or more openings along its perimeter, and a securing slot for securing the bidet washing apparatus to a toilet bowl;
  - a half ring having at least two pins or dowels along its inner perimeter, each configured to engage one of the two or more openings along the perimeter of the disk; and
  - a bracket holder having two bracket holder arms, wherein each bracket holder arm includes an internal ridge, lip or slot for securing the half ring;
  or
  - a half ring having two or more openings along its inner perimeter;
  - a disk having at least two pins or dowels along its perimeter, each configured to engage one of the two or more openings on the inner perimeter of the half ring, and a securing slot for securing the bidet washing apparatus to a toilet bowl; and
  - a bracket holder having two bracket holder arms, wherein each bracket holder arm includes an internal ridge, lip or slot for securing the half ring;
- one or more water inlets configured to supply water to the bidet washing apparatus;
- a control unit, including one or more control switches configured to control water flow from the one or more water inlets; and
- a nozzle assembly including at least one washing nozzle, wherein the at least one washing nozzle is positionable for directing the water flow to the one or more body parts of the user.

20. The bidet washing apparatus of claim 19, wherein the disks are polygon-shaped disks.

21. The bidet washing apparatus of claim 19, wherein the disks are each independently a geometric shaped disk selected from a circle, triangle, rectangle, rhombus, square, and a trapezoid.

22. The bidet washing apparatus of claim 19, wherein the securing slot on the disks is a U-shaped securing slot.

23. The bidet washing apparatus of claim 19, wherein the pins or dowels along the inner perimeter of the half ring is inserted into one of the two or more openings on the disk at about 180 degrees to each other.

24. The bidet washing apparatus of claim 19, wherein the at least two pins or dowels along the perimeter of the disk are inserted into the two or more openings along the inner perimeter of the half ring at about 180 degrees to each other.

25. The bidet washing apparatus of claim 19, wherein each bracket holder can rotate vertically about the pins or dowels of the half ring or the pins or dowels of the disks.

26. The bidet washing apparatus of claim 19, wherein the securing slots on the disks are substantially parallel to each other.

27. The bidet washing apparatus of claim 19, wherein the securing slots on the disks can each independently rotate about a vertical axis from about −45 degrees to about +45 degrees.

* * * * *